United States Patent [19]

Sakaguchi et al.

[11] 4,412,561

[45] Nov. 1, 1983

[54] GLASS FIBER-REINFORCED CEMENT NON-PLATE ARTICLES

[75] Inventors: Keizo Sakaguchi, Kawanishi; Shigeru Takeuchi, Osaka, both of Japan

[73] Assignee: Kurimoto Iron Works, Ltd., Osaka, Japan

[21] Appl. No.: 222,861

[22] Filed: Jan. 7, 1981

[30] Foreign Application Priority Data

Jan. 11, 1980 [JP] Japan .................................. 55-2834
Apr. 28, 1980 [JP] Japan ................................. 55-58227

[51] Int. Cl.³ ............................................. F16L 9/08
[52] U.S. Cl. ................................... 138/174; 138/140; 138/145; 138/152; 138/153; 138/175; 138/DIG. 2; 428/247

[58] Field of Search ............... 138/140, 141, 144, 145, 138/153, 151, 152, 172, 174, 175, DIG. 2; 428/247, 251, 285, 289, 703, 119; 52/309.12, 309.17

[56] References Cited

U.S. PATENT DOCUMENTS

| | | | |
|---|---|---|---|
| 1,639,999 | 8/1927 | Humphreys | 138/175 X |
| 3,581,780 | 6/1971 | Ono et al. | 138/175 |
| 4,335,177 | 6/1982 | Takeuchi | 428/119 |

*Primary Examiner*—James E. Bryant, III
*Attorney, Agent, or Firm*—Flynn, Thiel, Boutell & Tanis

[57] ABSTRACT

A glass fiber-reinforced cement non-plate article is composed of an inside mortar layer comprising a mixture of normal Portland cement and glass fiber chopped strand, an outside mortar layer comprising a mixture of normal Portland cement and glass fiber chopped strand, and a regulated set cement mortar layer interposed between said both layers by the aid of a continuous glass fiber layer.

10 Claims, 19 Drawing Figures

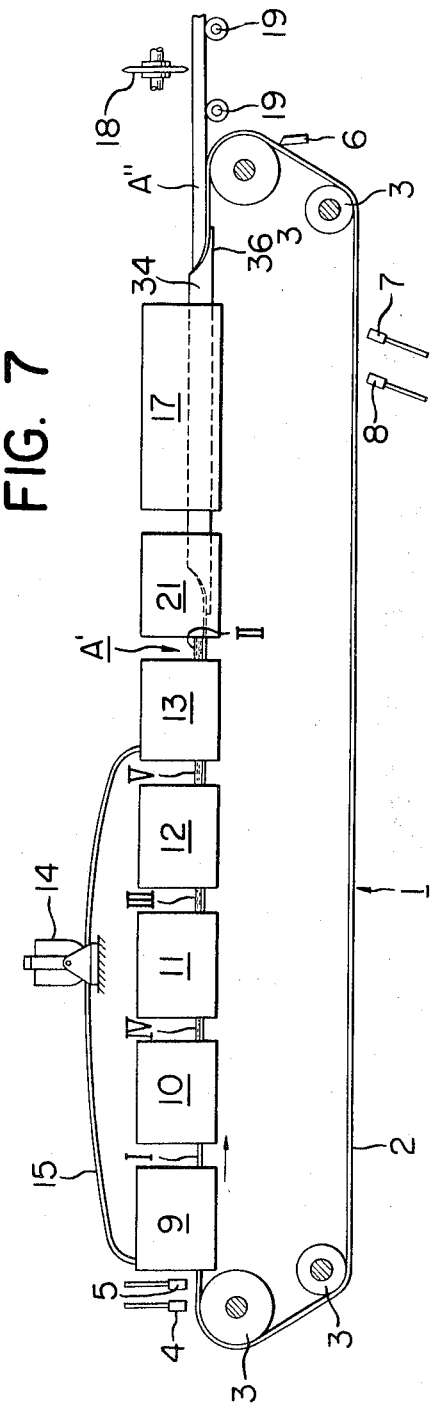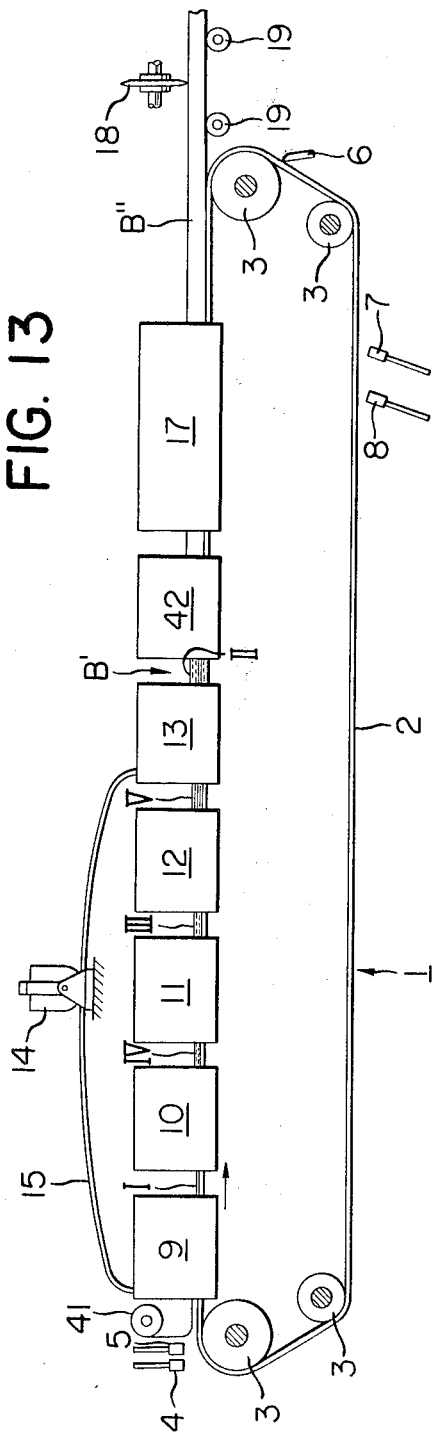

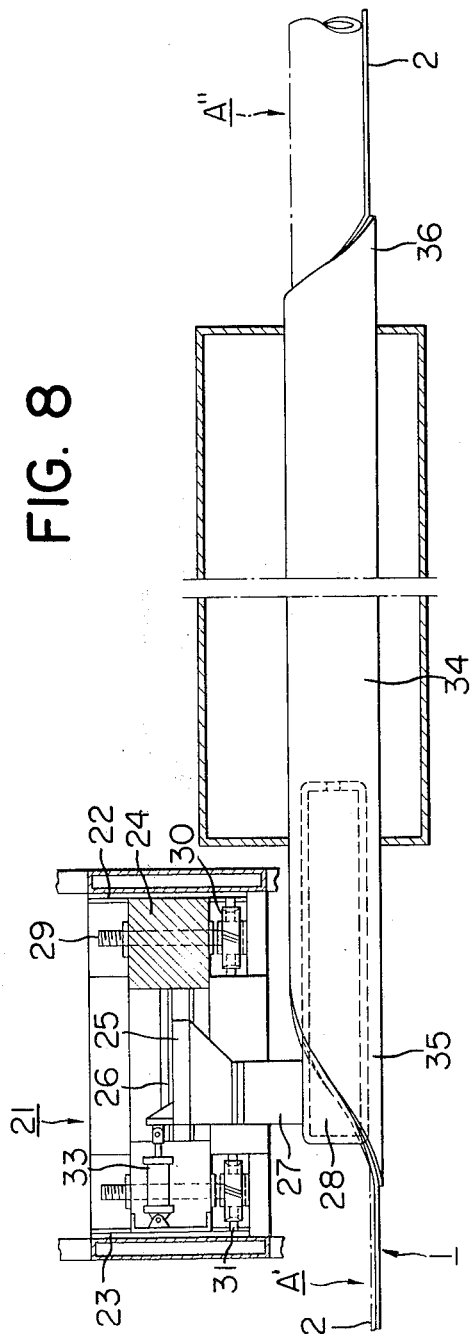
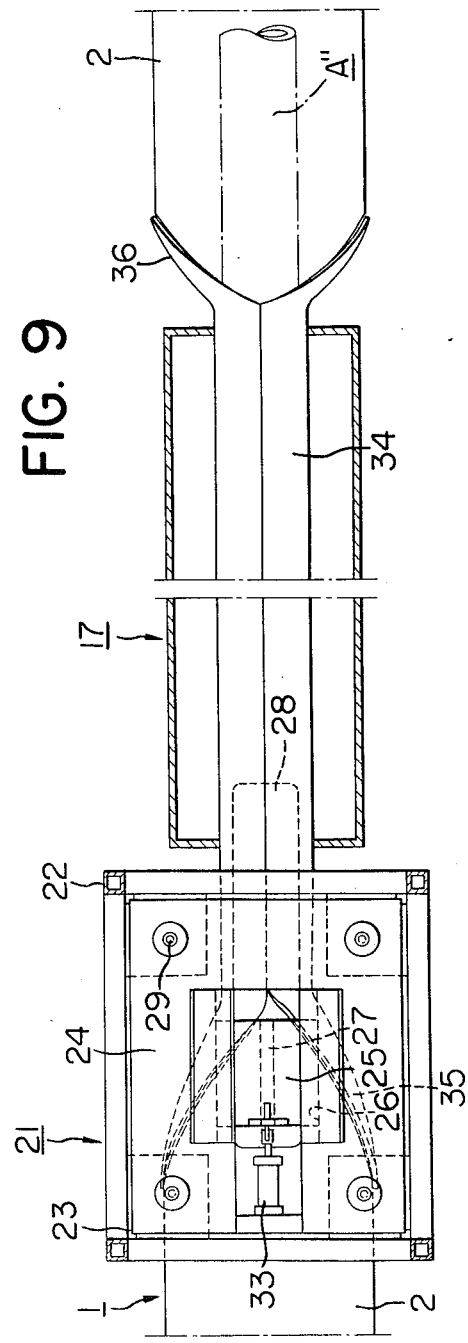

GLASS FIBER-REINFORCED CEMENT NON-PLATE ARTICLES

BACKGROUND OF THE INVENTION

This invention relates to a continuous, automatic process of manufacturing glass fiber-reinforced cement non-plate articles such as pipes and troughs (which will be referred to as GRC articles) composed of an inside mortar layer comprising a mixture of normal Portland cement and glass fiber chopped strand, an outside mortar layer comprising a mixture of normal Portland cement and glass fiber chopped strand, and a regulated set cement mortar layer interposed between said both layers through a continuous glass fiber layer, an apparatus therefor, and the GRC articles thereby produced.

Conventional formed articles such as cement pipes and troughs have generally been manufactured by using a molding flask with reinforcing bars arranged therewithin, in accordance with a centrifugal method for the pipes and a batch method such as a manual operation for the troughs.

However, conventional articles are defective in that, depending on the conditions such as the bonding strength between the cement and reinforcing bars, the compounding ratio of sand and the like, the thickness of the articles must be increased in order to have the necessary strength, with the unfavorable results that the articles are of increased weight, the cost of their transportation becomes high, installation takes much time, and so forth.

Further, the conventional articles are defective because a long period of time is required for curing them, the forming cycle is prolonged, and productivity is decreased, whereby it becomes extremely difficult to provide articles cheaply, and additionally the obtained articles come to lack uniformity in quality.

SUMMARY OF THE INVENTION

It is an object of this invention to provide GRC articles which are capable of eliminating the aforesaid drawbacks involved in conventional GRC articles and which can be manufactured in a short time and inexpensively.

It is another object of this invention to provide GRC articles wherein two outside mortar layers comprise a mixture of normal Portland cement and glass fiber chopped strand, and a regulated set cement mortar layer is interposed between said two outside layers through a continuous glass fiber layer, wherein the strength of the produced articles can be enhanced by the presence of the continuous glass fiber layer, and the time required for curing the normal Portland cement mortar contained in both outside layers can be shortened by the action of the regulated set cement mortar.

It is a further object of this invention to provide a continuous, automatic process of manufacturing GRC articles from intermediate products namely, GRC plates, which comprises successively laminating, on a travelling belt conveyer, a mortar layer consisting of a mixture of normal Portland cement mortar and glass fiber chopped strand, a continuous glass fiber layer, a regulated set cement mortar, a continuous glass fiber layer and a mortar layer consisting of a mixture of normal Portland cement mortar and glass fiber chopped strand in that order to thereby form a GRC plate then; introducing both side portions of the resulting GRC plate between an outer molding flask and an inner molding flask disposed on each side corresponding to said two side portions respectively and bending it to form the desired solid GRC article; and curing the thus formed article by allowing it to pass through a curing zone. If the intended article is a pipe, this object can be achieved the employing, as the outer molding flask, a pipe member and by employing, as the inner molding flask, a tubular member disposed within the outer molding flask at a distance substantially equal to the thickness of the article. If the intended article is a trough, this object can be achieved by employing, as inner and outer molding flasks, two pairs of plates provided at regular intervals on the belt along its travelling direction, each pair being orientated longitudinally leaving a space substantially identical with the thickness of the article therebetween.

It is a still further object of this invention to provide an apparatus for manufacturing GRC articles wherein an inner molding flask is allowed to reciprocate along the travelling direction of a belt, whereby the inside surface of the article can be pressed smoothly.

It is another important object of this invention to provide an apparatus capable of manufacturing GRC articles having a variety of dimensions and/or shapes by mounting inner and outer molding flasks on a belt so that their location may be adjustable vertically or horizontally at a right angle relative to the belt.

BRIEF DESCRIPTION OF THE DRAWING

FIG. 7 is a schematic front view illustrating one embodiment of an apparatus for manufacturing pipes according to this invention.

FIG. 8 is a partial vertical front view of the apparatus for manufacturing pipes embodied in FIG. 7.

FIG. 9 is a partial cross-sectional plan view of the apparatus illustrated in FIG. 8.

FIG. 13 is a schematic front view of one embodiment of an apparatus for manufacturing troughs according to this invention.

DETAILED DESCRIPTION OF THE INVENTION

Figure 1:
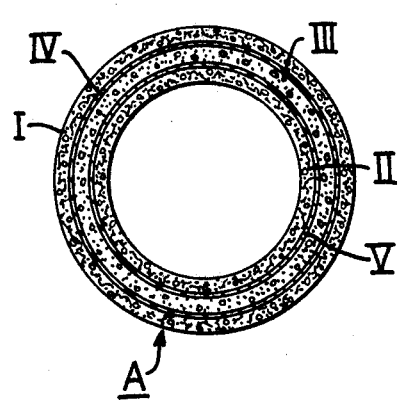
FIGS. 1 to 4 are vertical sectional views illustrating various kinds of pipes and troughs according to this invention.
Figure 2:
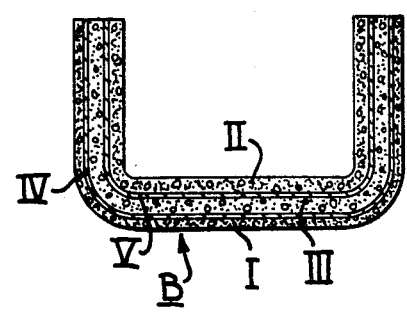
Figure 3:
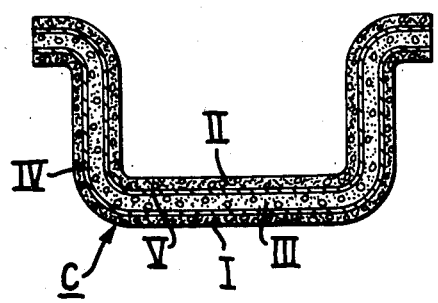
Figure 4:
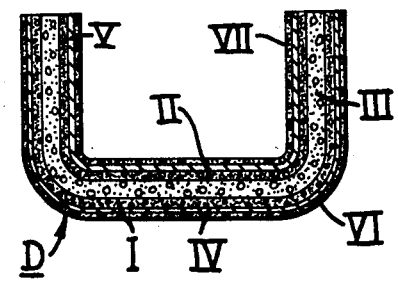

FIGS. 1 to 4 illustrate differently shaped articles according to this invention. In particular FIG. 1 illustrates a pipe A and FIGS. 2 to 4 illustrate differently shaped troughs B, C and D.

In the articles A, B and C illustrated in FIGS. 1 to 3, I and II each denote an outside mortar layer comprising a mixture of normal Portland cement mortar and glass fiber chopped strand, IV and V denote each a continuous glass fiber layer, and III denotes an intermediate mortar layer comprising a regulated set cement alone or a mixture of regulated set cement and normal Portland cement mortar.

The trough D illustrated in FIG. 4 is composed of mortar layers I and II which comprise a mixture of normal Portland cement mortar and glass fiber chopped strand and are disposed inside continuous glass fiber layers IV and V; an intermediate mortar layer III which comprises a regulated set cement only or a mixture of regulated set cement and normal Portland cement mortar and is interposed between said mortar layers I and II; and outside layers VI and VII which are formed outside the continuous glass fiber layers IV and V by allowing the mortar contained in the mortar layers I and II to exude therethrough, and are substantially free from glass fiber chopped strand.

Figure 5:
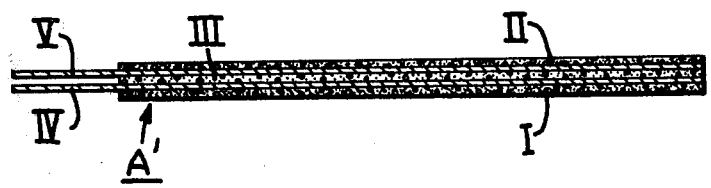
FIGS. 5 and 6 are vertical sectional views illustrating intermediate products for forming the aforesaid articles according to this invention.
Figure 6:
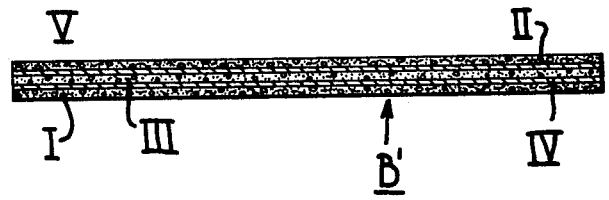
Figure 10:
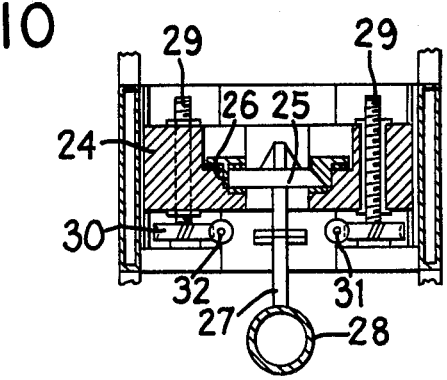
FIG. 10 is a partial vertical sectional side view of the apparatus illustrated in FIG. 8.

These articles are generally prepared by obtaining an intermediate product through a primary processing stage and then forming it into a desired shape through a secondary processing stage. In this connection, an intermediate plate product A' for use in the formation of pipe A is shown in FIG. 5 and an intermediate product B' for use in the formation of troughs B, C and D is shown in FIG. 6.

The intermediate product A' is exactly identical in structure with the intermediate product B' with the exception that in the former the continuous glass fiber layers IV and V protrude on one side.

Plates which are exactly identical in structure with this intermediate product B', the process for manufacturing such plates and the apparatus therefor are disclosed in Japanese Patent Application Ser. No. 129019/1979 filed previously by these applicants.

In view of the foregoing, it is to be noted that the detailed explanation in this respect will be omitted and an outline thereof shall be given hereinafter.

FIGS. 7 to 10 each illustrate an embodiment of the apparatus for manufacturing pipe A.

In FIG. 7, reference numeral 1 denotes a conveyor, and both end turning portions of an endless belt 2 made of a heat resistant material such as steel are supported by two pairs of front and rear drive rollers 3, respectively, and allowed to travel at a fixed rate in the direction of the arrow by means of an appropriate driving means. Reference numeral 4 denotes an air blower disposed above the front end of the conveyor 1 for cleaning the belt 2 by blowing air thereon, and reference numeral 5 denotes a means for spraying a parting sheet onto the belt 2. Under the rear end there are provided a scraper 6 for removing the adhesives from the belt 2, a water injection nozzle 7 for injecting a washing water and an air blower 8 for blowing dry air.

Reference numeral 9 denotes a supply means for normal Portland cement mortar and glass fiber chopped strand, 10 denotes a supply means for continuous glass fiber, 11 denotes a supply means for regulated set cement mortar, 12 denotes a supply means for continuous glass fiber, 13 denotes a supply means for normal Portland cement mortar and glass fiber chopped strand, 14 denotes a mixer, 15 and 16 denote supply pipes, 17 denotes a curing room, 18 denotes a cutter, and 19 denotes article supporting rollers.

The foregoing parts are disclosed previously in Japanese Patent Application Ser. No. 129019/1979, but the principal parts thereof shall be outlined hereinafter.

The supply means 9 comprises mounting a spray nozzle for a normal Portland cement mortar mixed by means of the mixer 14 and a means for spraying glass fiber rovings cut by means of a cutter together with said mortar onto the belt 2 on a truck reciprocating across the whole width of the belt 2. The mortar layer 1 formed on the belt 2 by the spraying action of the supply means 9 is provided with a roller rotating at a right angle relative to the belt 2, a roller orientated longitudinally and reciprocating horizontally, and a vibrator for press-adhering as well as deairing purposes.

The supply means 10 is designed to spread a long, narrow strip piece of continuous glass fiber such as a netted fabric or the like on the mortar layer I and press-adhere it to the layer I by means of a roller rotating at a right angle relative to the belt and a roller orientated longitudinally and moving horizontally' or a vibrator.

The supply means 11 is designed to supply, through a fixed quantity supply means, a regulated set cement mortar alone or a mixture of said cement mortar and normal Portland cement mortar onto the continuous glass fiber IV supplied by the supply means 10, and regulating the same so as to have a fixed thickness by means of a roller, vibrator, sheathing board or the like.

The supply means 12, which is exactly identical in structure with the supply means 10, is designed to supply the continuous glass fiber V onto the layer III comprising the regulated set cement mortar supplied by the supply means 11 and then spreading the regulated set cement mortar herein.

The supply means 13, which is exactly identical in structure with the supply means 9, is designed to form the mortar layer II by spraying the glass fiber chopped strand together with the normal Portland cement mortar on the continuous glass fiber V supplied by the supply means 12 and subject the same to press-adhering and deairing treatments by means of a roller or the like, wherein, however, there is a case wherein the glass fiber chopped strand only is sprayed thereon. In this instance, the continuous glass fiber layers IV and V are arranged to be longer than the mortar layers I, II and III and, as shown in FIG. 5, are each allowed to have a portion extending outwardly from one end of the mortar layer.

Through the aforesaid steps, there is formed the intermediate product A' as illustrated in FIG. 5 on the belt 2 at a position after passing the means 13.

The thus formed intermediate product A' is then carried on the belt 2 to a pipe forming apparatus 21 as illustrated in FIG. 7 and is there formed into a pipe A". The particulars of this pipe forming apparatus 21 will be explained with reference to FIGS. 8 to 10 hereinafter.

This pipe forming apparatus 21 includes a lifting frame 24 which is designed to ascend and descent along the four corners of vertical guide rails 23 disposed at the four corners of a frame 22 provided across the belt 2, a movable frame 25 reciprocating along guide rails 26 provided at the both sides within this frame 24 along its travelling direction, and a supporting frame 27 mounted detachably on the lower part of this movable frame 25.

A circular mandrel 28 is fixed to the lower end of this supporting frame 27 for the purpose of finishing the inside of the pipe.

A vertical hole is located in the vicinity of each of the four corners of the lifting frame 24. The lower part of a screw bar 29 screwed into a screw tube fitted vertically in said hole is secured rotatably but non-liftably to the lower part of the frame 22, and a worm wheel 30 is secured to the lower end of each screw bar 29.

Reference numeral 31 denotes a pair of right and left horizontal rotating shafts provided on both inner sides of the frame 22. The lifting frame 24 is designed to ascend and descend by screw engaging a worm 32, fixed to this shaft 31, with a worm wheel 30 and rotating these shafts 31 simultaneously by means of a suitable driving mechanism to thereby rotate each screw bar 29 by means the worm 32 and worm wheel 30. In this connection, however, it is also possible to raise and lower the lifting frame 24 by using a means other than above illustrated means, for instance, such as a pressure oil cylinder or the like.

Reference numeral 33 denotes an air cylinder equipped within the lifting frame 24. This piston bar is connected with the movable frame 25 for reciprocating the mandrel 28 back and forth, thereby finishing the inside of the product.

The curing room 17 is maintained at a temperature of about 80° C. by using steam or the like. Reference numeral 34 denotes a guide pipe which is arranged to pass through the curing room 17 outside of the mandrel 28 and protrude from the front of the curing zone. This guide pipe is fixed detachably to the curing room 17 and is so designed that its front end portion 35 is enlarged outside of the mandrel 28 as shown in FIG. 9 so as to guide the belt 2 upwards from below and then the belt and the intermediate product A' therein are simultaneously rolled up within a tubular space formed between the mandrel 28 and the guide pipe 34, thereby shaping the intermediate product into a cylindrical form.

Figure 12:
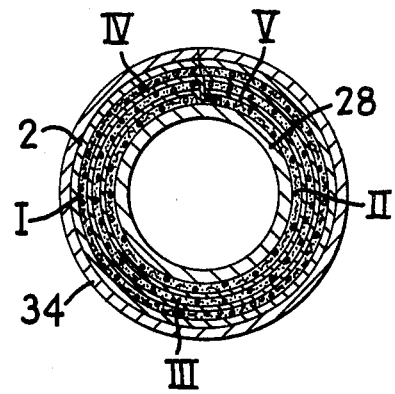

The intermediate product A' conveyed on the belt 2 to the pipe forming apparatus 21 is guided inside the guide pipe 34 together with the belt 2 to be shaped into a tubular form. Then, this tubular body is formed into a pipe A" illustrated in FIG. 12 by the cooperation of the mandrel 28 with the guide pipe 34 by allowing the inside of the guide pipe to surround the outer periphery of the mandrel 28 and reciprocating the mandrel 28 back and forth to the front and rear by means of the cylinder 33.

Figure 11:
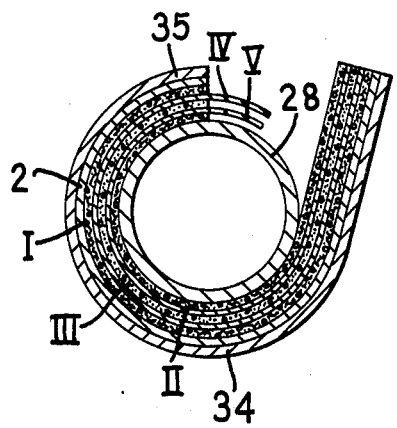
FIGS. 11 and 12 are vertical sectional views showing a part of the pipe forming step using the apparatus illustrated in FIG. 7.

In order that the intermediate product A' may be introduced smoothly into the guide plate 34, it is preferable that the front end portion 35 should be made to have on both sides different roll up positions as shown in FIG. 11 so that the protruding end of each of the continuous glass fibers IV and V may first be wound round the mandrel 28 and then the other side may be wound round it.

The thus formed pipe A" is cured during its passage through the curing room 17 and comes out of the curing room 17 with sufficient strength.

The rear end portion 36 of the guide pipe 34 takes an enlarged plan form as illustrated in FIG. 9 and the belt 2 per se is restored to its original shape by virtue of its own elasticity. Accordingly, deposits on the surface of the belt 2 are removed therefrom by the scraper 4 while said belt runs along the outside of the roller 3 and then downwards, the belt is cleaned with water injected through the water injection nozzle 7, and the remaining water is blown off by the air blower 8.

The pipe A" sent out from the belt 2 is cut by means of the rotary cutter 18. This cutter is designed to repeat the following movement comprising cutting the pipe A" while moving concurrently with the pipe A" carried on the roller 19, cutting the pipe off and then returning to its original position. In this connection, it is preferable that the mandrel 28 should be made hollow to accommodate therein a heating means utilizing steam or the like so that the pipe A" wound round the mandrel 28 may be fully cured by heating it from the inside and outside. When there is a need for varying the dimensions, configuration and so forth of the product A, this may be achieved by removing the supporting frame 27 from the movable frame 25 for replacing the mandrel 28 and guide pipe 34 by new ones of the desired dimension and shape respectively and further moving the mandrel 28 to a proper position by turning the screw bar 29. In addition, when a space is left between upper sides of the guide pipe 34 and both sides of the belt 2 are rolled upwards, it is possible to pour a GRC mortar namely, a mixture of glass fiber strands and cement mortar, into this space and finish this portion by means of a roller.

In FIGS. 13 to 19 there are illustrated embodiments of the apparatuses for manufacturing troughs B, C and D.

With reference to these manufacturing apparatuses the, same symbols are used for parts similar to those employed in the aforesaid pipe A manufacturing apparatuses in order to omit explanations thereof, and on the other hand different parts will be detailed.

In FIG. 13, reference numeral 41 denotes a parting sheet such as vinyl sheet, glass sheet, nylon sheet, paper or the like, which is designed to be put on the belt 2 and travel concurrently therewith, and 42 denotes a trough forming apparatus disposed between the supply means 13 and the curing room 17. The particulars of said trough forming apparatus are as shown in FIGS. 14 to 19.

FIGS. 14 to 17 illustrate a first embodiment of the trough forming apparatus 42, wherein the upper ends of fixing arms 46 for a pair of right and left outer molding panels 45 are slidably mounted on a plurality of horizontally situated guide bars 44 provided in a frame 43 disposed across the belt 2. And, the frame 43 is also provided rotatably with a horizontally situated screw bar 47. This screw bar is provided with a bisymmetrical screw. The trapped hole formed on the upper end of a fixing arm 46' of the molding panel 45 is screwed onto this bisymmetrical screw, whereby the right and left molding panels 45 are permitted to draw near to or part from each other by turning this screw bar 47 by means of a motor or handle (not shown).

Reference numeral 48 denotes a pair of right and left longitudinally situated horizontal guide rails fixed to the frame 43. A movable frame 49 is designed to reciprocate along the rails 48. This movable frame 49 is provided with a plurality of horizontally situated horizontal guide bars 50. The upper ends of fixing arms 52 for a pair of right and left inner molding panels 51 are slidably mounted on said guide bars 50. The movable frame 49 is also provided rotatably with a horizontally situated screw bar 53. This screw bar is provided with a bisymmetrical screw. This bisymmetrical screw is screwed in trapped holes formed on the upper ends of fixing arm 52, 52' for the molding panels 51, whereby the right and left inner molding panels 51 are permitted to draw near to or part from each other by rotation of this screw bar 53 clockwise or counterclockwise by means of a motor 54 through chain transmission or the like.

Figure 14:
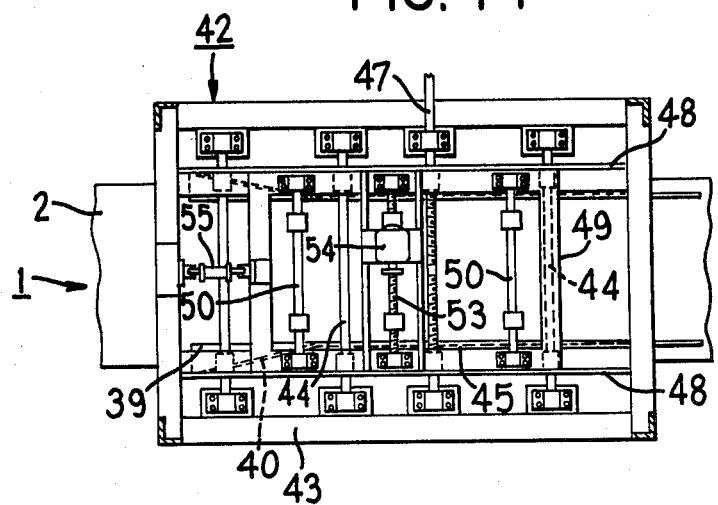
FIG. 14 is a partial cross-sectional plan view of the trough forming apparatus embodied in FIG. 13.
Figure 15:
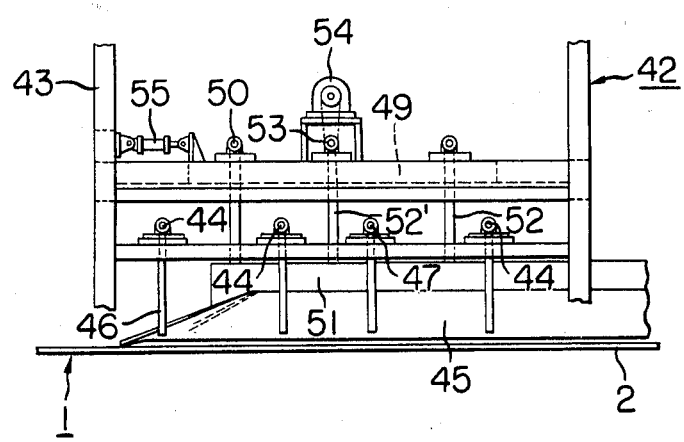
FIG. 15 is a front view of the trough forming apparatus illustrated in FIG. 14.
Figure 16:
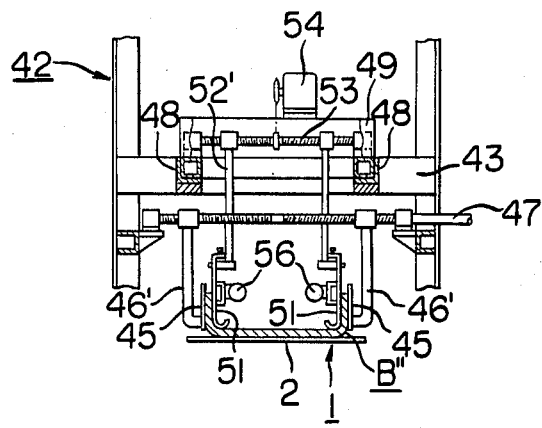
FIG. 16 is a partial vertical sectional side view of the trough forming apparatus illustrated in FIG. 14.

The outer molding panels 45, as FIG. 16 shows, comprise a pair of plates erected on the belt 2 leaving a space narrower than the width of the belt 2 therebetween, said space being set to be equivalent to that between both outside surfaces of the product. The front end portions of the plates, as FIG. 14 shows, comprise a horizontal portions 39 located on the belt 2 and slanted portions 40, the former being substantially identical in width with the belt 2, the latter being slanted gradually inwardly in the forward direction.

The inner molding panels 51 are disposed inside the outer molding panels 45 leaving a space equal to the thickness of the product therebetween and the insides thereof are provided with a vibrators 56 respectively.

Between the frame 43 and the movable frame 49 there is disposed an air cylinder 54 which functions to reciprocate this movable frame 49 to the front and rear.

Figure 17:
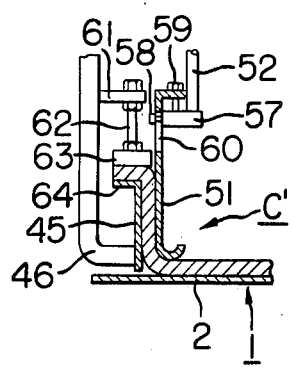
FIG. 17 is a partial vertical side view of a modified embodiment of the trough forming apparatus illustrated in FIG. 14.

In FIG. 17 there is shown a mechanism for forming a flange portion of the flanged trough C as illustrated in FIG. 3, in which the molding panel 51 is devised to be fixed to a supporting strip 57 by abutting the molding panel 51 to the outside of the supporting strip 57 located at the lower end of each arm 52, 52' and screwing a fixing bolt 58, inserted in a longitudinal slit of this molding panel 51, into a hole in the supporting strip 57. The molding panel 51 has an inward flange formed at its upper end, and an adjusting bolt 59 is screwed in a slit in the inward flange with its lower end abutting on the upper surface of the supporting strip 57. The height and location of the molding panel 51 may be adjusted in the manner of loosening the bolt 58, operating the bolt 59 so that the molding panel 51 may be positioned, and then tightening the bolt 58 for fixing the molding panel 51.

In this connection, it is to be noted that the structure referred to hereinbefore is common to a flange-free trough forming apparatus 42, whereas the following structure is unique to the flange forming apparatus. A flange is arranged to be formed by fixing a supporting bar 62 in a vertically adjustable manner to a supporting strip 61 provided inside the arm 46, providing a flange forming plate 63 at the lower end of the supporting bar and bending the upper end sides of trough C' outwardly by the cooperation of this plate 63 with an outward flange 64 formed on the upper end of the molding panel 45.

According to the above structure, the intermediate product B' transferred to the trough forming apparatus 42 by the belt 2 is stripped off from the belt 2 together with the parting sheet 41 by the horizontal portions 39 situated at the front end of the outer molding panels. Both outside surfaces of the intermediate product are erected gradually along the slanted portions 40, the inside surfaces abut the inner molding panels 51, and the inner molding panels 51 are allowed to reciprocate to the front and rear by the cylinder 55, whereby the trough B'' as illustrated in FIG. 16 can be formed by the action of both pairs of molding panels 45, 51.

Figure 18:
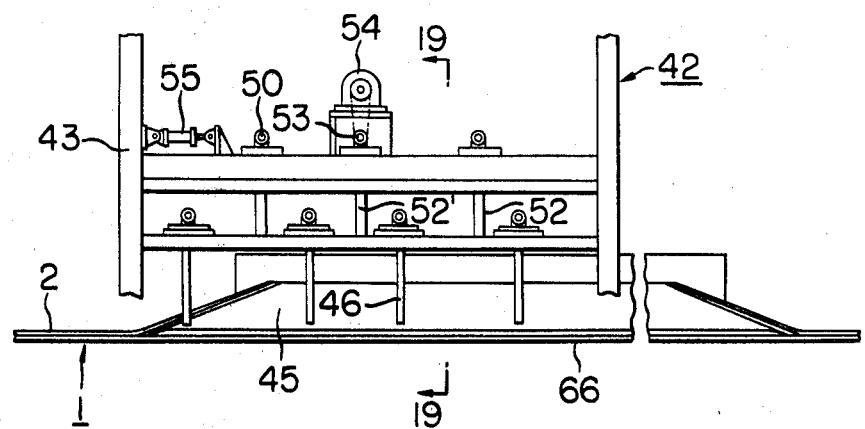
FIG. 18 is a front view of another embodiment of the trough forming apparatus according to this invention.
Figure 19:
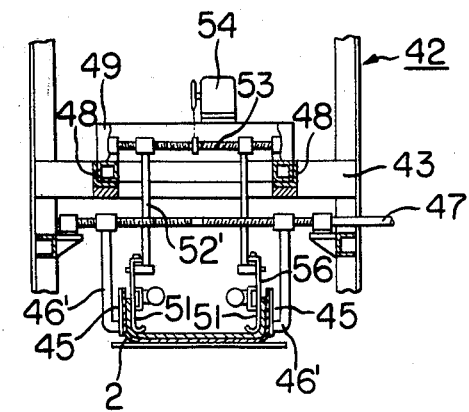
FIG. 19 is a cross-sectional view taken along the lines 19—19 of FIG. 18.

FIGS. 18 and 19 illustrate another embodiment of the trough forming apparatus 42. This embodiment is so constructed that the lower portion of the belt 1 is supported by a horizontal supporting plate 66, the belt 2 together with intermediate product B' is bent in an upward U-shape, is introduced between the outer molding panels 45 and the inner molding panels 51 and passed through the curing room 17, and thereafter the belt 2 is put back in its original position. In this case, the rest of structure is the same as illustrated in FIGS. 14 to 17. The same symbols apply to the same parts.

Although particular preferred embodiments of the invention have been disclosed hereinabove for purposes of illustration, it will be understood that variations or modifications thereof which lie within the scope of the invention as defined by the appended claims are fully contemplated.

What is claimed is:

1. A glass fiber-reinforced, cement mortar article having a non-planar shape, which comprises an inner layer comprised of a mixture of Portland cement and chopped glass fiber strands; a first layer of continuous glass fibers located on said inner layer; an outer layer comprised of a mixture of Portland cement and chopped glass fiber strands; a second layer of continuous glass fibers located on said outer layer; and an intermediate layer comprised of regulated set cement interposed between said inner and outer layers.

2. An article as claimed in claim 1 wherein said first and second continuous glass fiber layers are located inwardly of said inner and outer layers and directly adjacent to said intermediate layer.

3. An article as claimed in claim 2 wherein said intermediate layer consists of a mixture of regulated set cement and Portland cement mortar.

4. An article as claimed in claim 2 wherein said intermediate layer consists of regulated set cement.

5. An article as claimed in claim 2 wherein said article is a pipe and, at one radial segment of said pipe said continuous glass fiber layers have adjoining portions thereof perpendicular thereto which extend radially inwardly into said inner layer, said portion of said first continuous glass fiber layer passing through said intermediate layer and said second continuous glass fiber layer.

6. An article as claimed in claim 1 wherein said article is a trough, the inner faces of each of said inner and outer layers being in direct contact with the opposite surfaces of said intermediate layer; said continuous glass fiber layers being in direct contact with the outer surfaces of said inner and outer layers; and said article further comprises two further layers comprised of Portland cement mortar and substantially free of chopped glass fiber strands, said further layers being in direct contact with the outer surfaces of said first and second continuous glass fiber layers, respectively.

7. An article as claimed in claim 6 wherein said intermediate layer consists of a mixture of regulated set cement and Portland cement mortar.

8. An article as claimed in claim 6 wherein said intermediate layer consists of regulated set cement.

9. An article as claimed in claim 2 wherein said article is a pipe.

10. An article as claimed in claim 2 wherein said article is a trough.

* * * * *